(12) United States Patent
Furmidge et al.

(10) Patent No.: US 7,259,690 B1
(45) Date of Patent: Aug. 21, 2007

(54) READER FOR UTILITY METER

(75) Inventors: Neil Furmidge, Sheffield (GB);
Richard Hall, Reading (GB); Ian Harvey, Bristol (GB); Tim Baker, Sheffield (GB)

(73) Assignee: MARS Company, Ocala, FL (US)

( * ) Notice: Subject to any disclaimer, the term of this patent is extended or adjusted under 35 U.S.C. 154(b) by 0 days.

(21) Appl. No.: 09/979,795

(22) PCT Filed: May 26, 2000

(86) PCT No.: PCT/GB00/02032

§ 371 (c)(1),
(2), (4) Date: Mar. 25, 2002

(87) PCT Pub. No.: WO00/73742

PCT Pub. Date: Dec. 7, 2000

(30) Foreign Application Priority Data

May 28, 1999 (GB) .................................. 9912559.3

(51) Int. Cl.
*G08C 19/20* (2006.01)
(52) U.S. Cl. ............................ 340/870.03; 340/539.11; 340/870.02; 705/412; 735/440
(58) Field of Classification Search ........... 340/870.02, 340/870.03, 870.31, 539.11, 539.14, 10.4, 340/572.4; 705/412; 235/436, 440
See application file for complete search history.

(56) References Cited

U.S. PATENT DOCUMENTS

| | | | | |
|---|---|---|---|---|
| 4,132,981 A * | 1/1979 | White | .................... | 340/870.02 |
| 4,463,354 A * | 7/1984 | Sears | .................... | 340/870.02 |
| 4,758,836 A * | 7/1988 | Scuilli | .................... | 340/870.31 |
| 5,111,407 A * | 5/1992 | Galpern | .................... | 702/62 |
| 5,252,967 A * | 10/1993 | Brennan et al. | ........ | 340/870.02 |
| 5,298,894 A * | 3/1994 | Cerny et al. | ........... | 340/870.02 |
| 5,602,744 A * | 2/1997 | Meek et al. | ................ | 705/412 |
| 6,078,251 A * | 6/2000 | Landt et al. | ............. | 340/10.41 |
| 6,264,106 B1 * | 7/2001 | Bridgelall | ............. | 235/462.46 |
| 6,509,828 B2 * | 1/2003 | Bolavage et al. | ......... | 340/10.1 |
| 6,617,962 B1 * | 9/2003 | Horwitz et al. | ........... | 340/10.4 |
| 6,720,866 B1 * | 4/2004 | Sorrells et al. | ........... | 340/10.4 |
| 6,963,282 B1 * | 11/2005 | Yeates et al. | ............ | 340/572.4 |
| 7,002,473 B2 * | 2/2006 | Glick et al. | ............. | 340/572.1 |

* cited by examiner

*Primary Examiner*—Albert K. Wong
(74) *Attorney, Agent, or Firm*—Simmons Patents; Monty Simmons

(57) ABSTRACT

A reader (1) for a utility meter is disclosed. The reader (1) is capable of receiving data, in a variety different communication protocols, by either inductive coupling or by radio frequency transmission. The reader (1) is a hand-held device which comprises an inductive read nozzle (2), a RF module, a display (4), a keypad (5), a trigger switch (6), a handle (7), a communication port (8), a battery charging interface (9), a memory and a microprocessor. The reader (1) is capable of storing utility usage data in memory and/or downloading utility usage data to a computer through the communication port (8).

44 Claims, 4 Drawing Sheets

READER FOR UTILITY METER

RELATED APPLICATIONS

The present application is a national phase application of PCT/GB00/02032, filed May 26, 2000, which claims priority to British Application Serial Number 9912559.3, filed May 28, 1999, the disclosures of which are hereby incorporated by this reference herein in their entirety.

BACKGROUND AND SUMMARY

This invention relates to a reader for a meter, and more specifically, although not exclusively, to a hand-held reader for a utility meter, particularly a water meter.

A wide variety of utility meters are known for measuring the supply of utilities, for example, gas, water and electricity. The measurement of utility supply allows each consumer to be charged according to the level of their use of the supply and discourages wasting of natural resources.

Although utility meters are, in general, provided with a display for displaying the level of utility consumption, the meters may often be located in inaccessible places. To facilitate the ease of reading the meter there is often a remote reading device provided. This may be a pad coupled to the meter through a wire link, or alternatively a radio frequency (RF) module. For a pad, the meter is read by electromagnetic inductive coupling through the pad with a reader device (in close proximity to the pad). For an RF module, the meter is read using radio frequency transmission (usually having a maximum range of about 90-400 meters) to transmit the utility usage data to a reader device having a suitable RF module.

Numerous utility meters are commercially available, and each may be provided with either a pad or an RF module for remote reading. In addition, the form of the data transmitted, specifically the data communication protocols, varies with each meter. This makes it difficult to provide a reading device which is able to read all the different possible meter types.

It is an object of the present invention to seek to mitigate these disadvantages.

According to the present invention there is provided apparatus for reading a meter, comprising means for receiving data by radio frequency transmission from the meter, and means for, inductively receiving data from the meter.

The apparatus may include an algorithm to determine the form of the incoming data from the initial portion of an incoming data stream. This scheme of meter reading is described in GB 2 277 392, which is hereby incorporated by reference. Once the form of the incoming data has been recognised then the data can be successfully received.

Prior art apparatus has employed a list of possible protocols for the data. The incoming data is examined using sequential trial reading, progressing through the list after each failure to recognise the data. This method may involve receiving the same data four or five times before it is correctly decoded. The use of the algorithm described above results in a faster read time for each meter, since the data protocols are determined from the initial portion of incoming data.

The algorithm may conveniently compare the first ten bits of an incoming data stream with a stored list of known protocols.

The meter may be a utility meter, such as a water meter.

BRIEF DESCRIPTION OF THE DRAWINGS

Embodiments will now be described, by way of example, with reference to the accompanying drawings, in which.

DETAILED DESCRIPTION

Figure 1:
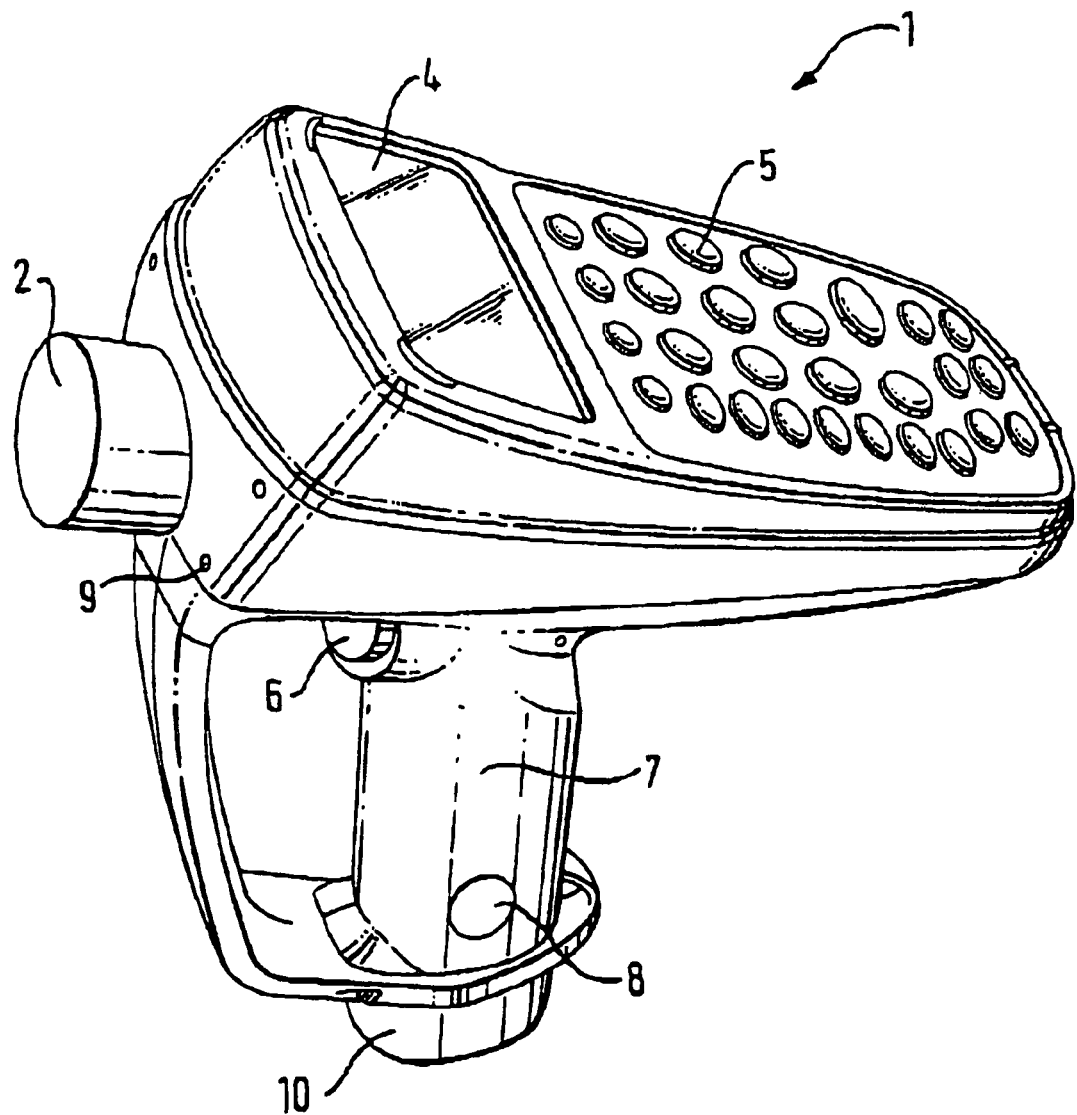
FIG. 1 shows a first perspective view of a meter reader according to the present invention.
Figure 2:
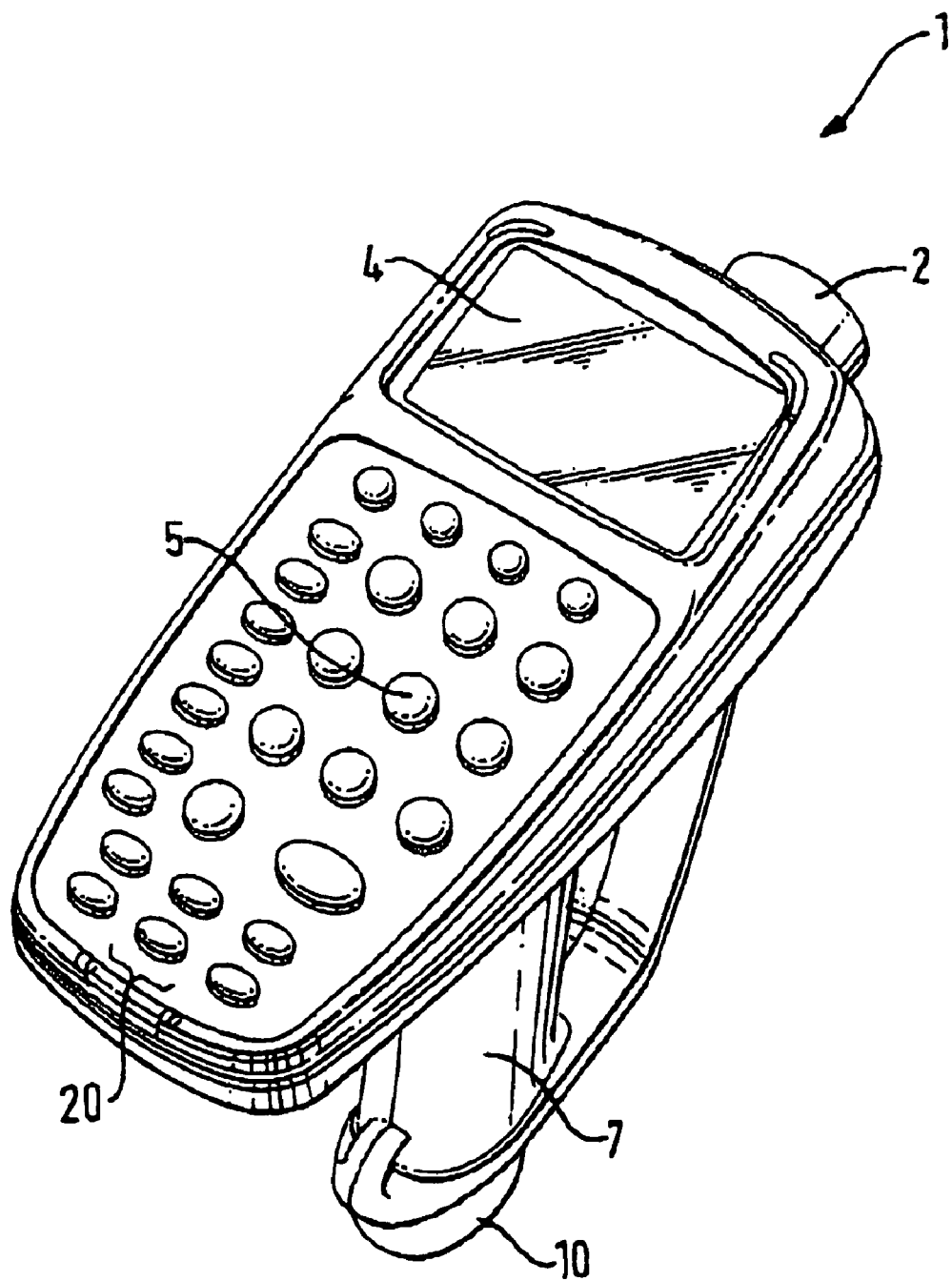
FIG. 2 shows a second perspective view of the meter reader.

A reader 1 is shown in FIGS. 1 and 2. The reader 1 comprises a nozzle 2, an RF module (not visible), a display 4, a keypad 5, a trigger switch 6, a handle 7, a communication port 8 and a battery charging interface 9. The reader also includes a memory and a microprocessor (not visible).

The nozzle 2 contains a coil (not shown), and is used to read a water meter through a pad connected by wire to a water meter. The meter reading is carried out by inductive coupling between the nozzle 2 and the pad. When the trigger switch 6 is operated an interrogation signal is applied to the coil which is inductively coupled to a coil in the pad. After the pad has received the interrogation signal it causes the meter reading to be generated as a data signal in the pad coil, which signal is transferred by the inductive coupling to the coil in the reader, and from that coil to the microprocessor in the reader.

The shape and configuration of the nozzle 2 are such that all known pads may be read. The nozzle 2 is replaceable, and may be easily swapped for a new nozzle should it sustain damage or if future developments result in a different design.

The reader 1 is able to read any water meter known to the applicant at the time of filing this patent application, even though different manufacturers meters send data in different formats. When the first portion of incoming data is received by the reader 1 the software will examine the first few (about ten) bits of data to determine the format of the data, and hence the applicable data communication protocols. When this determination has been made the meter may then be read and interpreted successfully. This scheme of meter reading is described in GE 2 277 392.

The RF module allows the reader 1 to read water meters using RF transmission. All known water meters known to the applicant at the time of filing this patent application fitted with a suitable RF module may be read.

Figure 3:
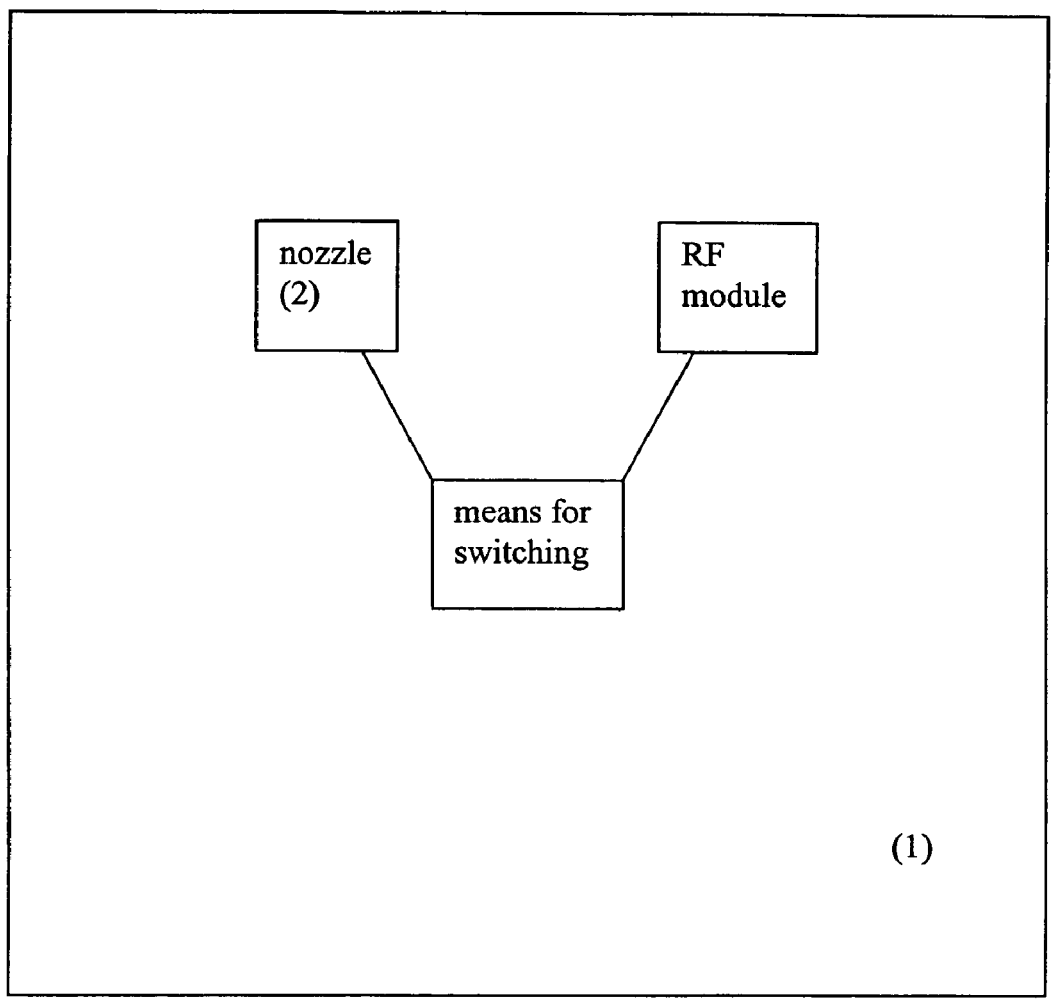
FIG. 3 shows the conceptual relationship between the nozzle 2 and the RF module of the meter reader.
Figure 4:
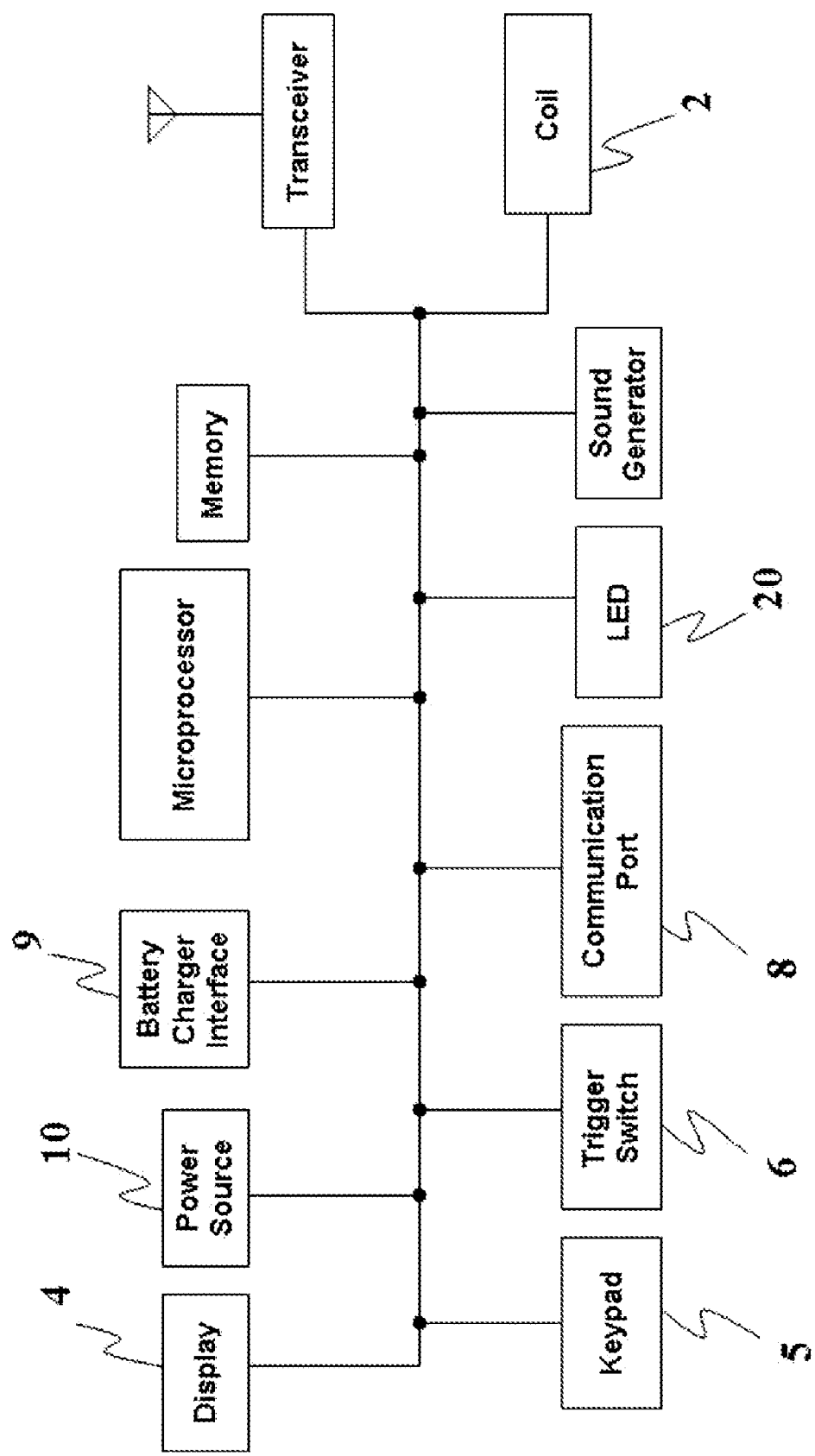
FIG. 4 is a block diagram illustration of the various components according to one exemplarily embodiment of the invention.

Combining the inductive read nozzle 2 and the RF module into a single reader 1, in combination with software (as shown in FIG. 3) which determines the make of the meter, allows a larger number of water meters to be read.

The user does not have to know in advance which type of reading method is required in order to switch the reader 1 into the correct mode. Instead, a meter reading route may be programmed in advance into the reader 1. The programmed route will include information about the type of reading to be made at each location and will switch the reader into the correct reading mode (inductive/RF) automatically, or will indicate to the user that manual keyword entry is required. The meter reading is initiated by the user pressing the trigger 6.

The programmed route may include data indicating what the expected reading should be at each location. If the actual reading is significantly different, the probe will automatically prompt the user to investigate for tampering, etc.

An LED 20 on the front of the reader indicates to the user the status of the meter reading. Red may indicate that the reading has been unsuccessful, amber may indicate that the reading is in progress, and green may indicate further reading has been successfully completed. A different audible signal is produced in each of these states. The LED and audible signals are in addition to status information appearing on display 4. Providing status indications in a number of forms is advantageous because the pad for obtaining the meter reading may be in a difficult to access position. The display 4 may be obscured. It may be noisy so that the audible signal cannot be recognised by the user.

The memory is used to store readings until they are downloaded. The user may also use the keypad to input meter readings or further information to accompany the meter readings. The microprocessor includes a real time clock which is used to time and date stamp all readings. Up to 4000 readings can be stored.

The communication port 8 is an RS-232 data port which can be used to provide direct electronic connection between the reader 1 and, for example, a computer. This may be used to download stored meter readings into the computer or to program a meter reading route into the reader 1. Software upgrades for the reader 1 may also be performed through the port, for example this could allow the operating system to be upgraded externally without having to replace the processor.

The display 4 is a high resolution liquid crystal display, suitable for displaying data from a meter reading, instructions to the user, or graphical information.

The RF module includes a bi-directional radio and is provided with a number of different possible functions. The first mode of operation involves the RF module transmitting a signal which causes water meters in range to begin transmitting. A large number of nearby water meters (each having an RF module) will usually respond, transmitting their data. This data includes the meter's individual identification number and the meter reading. The meters transmit data in a time-staggered manner, so that the data from each meter is received at a different time. Transmission could be delayed according to each meter's ID number, according to a value from a random number generator, or according to a meter's ID number multiplied by a value from a random number generator. The RF module in the reader 1 may have to receive a large number of responses, for example from 400 water meters, and will store these in memory.

A second mode of operation for the RF module is two-way transmission, which allows the reader 1 to interrogate a specific water meter. This mode is especially useful if during the first mode of operation the reader 1 fails to record or distinguish one of the incoming transmissions. The RF module will transmit a specific signal, which includes the identification number for the nominated water meter. All nearby water meters will receive the transmission, but only the one which has the relevant identification number will respond, transmitting data to the reader 1.

A third mode of operation for the RF module provides a RF link between the reader 1 and a computer. The computer may be located, for example, in a vehicle of the user when he is carrying out a number of meter readings. The meter readings can be downloaded to the computer through the RF link as an alternative to using a direct data link through the port 8. This may be done automatically by the reader 1 if the memory storage is almost full. Also, if the meter reading route is stored in a computer instead of in the reader 1 then the reader 1 can be provided with information about the next meter reading through the RF link.

The data is downloaded in CDT (Comma Delimited Text) format. Data may be selectively downloaded. The reader is capable of reading data at two or more frequencies. This allows a wider variety of meters to be read by the probe.

The reader 1 includes a power source, provided by a battery 10 in the handle 7. This may be recharged through the battery charging interface 9 or may be replaced.

The keypad 5 and software run by the reader 1 may allow for personalisation of the reader. For example the reader could request entry of a username and password.

The reader may also include a means which allows an appropriately configured pad or meter to be programmed via a signal from the nozzle 2. The reader can alter the serial number of a meter or may reset the meter count.

The probe described above is the most complex embodiment. The probe would be provided with less memory (to store, for example, 10-100 readings). In this instance "a hand-held" computer would also be carrier by the user and readings would be transmitted by cable or radio to the hand-held computer. The reader provides the user with a menu allowing him or her to configure the output for different types of hand-held computer.

The probe (or a hand-held computer, if one is connected) may provide a menu and means that allow the user to set which type of meters are to be read. If the list of meters is restricted, the meters can be read more quickly because the algorithm (from GB 2 277 392) will need to test for fewer data types.

The reader may be used with the meter described in United Kingdom patent application number 9912561.9 which is hereby incorporated by reference.

The invention claimed is:

1. An apparatus for reading a utility meter, comprising:
   means for receiving data by radio frequency transmission from a utility meter;
   means for inductively receiving data from the meter; and
   means for switching between the means for receiving data by radio frequency transmission and means for inductively receiving data, wherein the switching means includes: a programmed reading route; and software configured to switch between the means for receiving data by radio frequency transmission and means for inductively receiving data according to the pre-programmed reading route.

2. The apparatus according to claim 1, wherein the utility meter includes a water meter.

3. The apparatus according to claim 1, further comprising keypad for entering data representative of meter readings.

4. The apparatus according to claim 1, further comprising a memory for storing a plurality of meter readings.

5. The apparatus according to claim 1, further comprising a data display for displaying data from a meter reading.

6. The apparatus according to claim 1, further comprising a communications port for communicating with an external computer.

7. The apparatus according to claim 1, further comprising an RF module for transmitting a signal which causes utility meters operably proximate the RF module to begin transmitting data.

8. The apparatus according to claim 1, further comprising an RF module for interrogating a predetermined utility meter by transmitting a signal which includes an identification number for the predetermined utility meter.

9. The apparatus according to claim 1, further comprising an RF module for providing an RF link to an external computer for downloading readings to the external computer.

10. The apparatus according to claim 2, further comprising a keypad for entering data representative of meter readings.

11. The apparatus according to claim 2, further comprising a memory for storing a plurality of meter readings.

12. The apparatus according to claim 3, further comprising a memory for storing a plurality of meter readings.

13. The apparatus according to claim 2, further comprising a data display for displaying data from a meter reading.

14. The apparatus according to claim 3, further comprising a data display for displaying data from a meter reading.

15. The apparatus according to claim 4, further comprising a data display for displaying data from a meter reading.

16. The apparatus according to claim 2, further comprising a communications port for communicating with an external computer.

17. The apparatus according to claim 3, further comprising a communications port for communicating with an external computer.

18. The apparatus according to claim 4, further comprising a communications port for communicating with an external computer.

19. The apparatus according to claim 5, further comprising a communications port for communicating with an external computer.

20. The apparatus according to claim 2, further comprising an RF module for transmitting a signal which causes utility meters operably proximate the RF module to begin transmitting data.

21. The apparatus according to claim 3, further comprising an RF module for transmitting a signal which causes utility meters operably proximate the RF module to begin transmitting data.

22. The apparatus according to claim 4, further comprising an RF module for transmitting a signal which causes utility meters operably proximate the RF module to begin transmitting data.

23. The apparatus according to claim 5, further comprising an RF module for transmitting a signal which causes utility meters operably proximate the RF module to begin transmitting data.

24. The apparatus according to claim 6, further comprising an RF module for transmitting a signal which causes utility meters operably proximate the RF module to begin transmitting data.

25. The apparatus according to claim 2, further comprising an RF module for interrogating a predetermined utility meter by transmitting a signal which includes an identification number for the predetermined utility meter.

26. The apparatus according to claim 3, further comprising an RF module for interrogating a predetermined utility meter by transmitting a signal which includes an identification number for the predetermined utility meter.

27. The apparatus according to claim 4, further comprising an RF module for interrogating a predetermined utility meter by transmitting a signal which includes an identification number for the predetermined utility meter.

28. The apparatus according to claim 5, further comprising an RF module for interrogating a predetermined utility meter by transmitting a signal which includes an identification number for the predetermined utility meter.

29. The apparatus according to claim 6, further comprising an RF module for interrogating a predetermined utility meter by transmitting a signal which includes an identification number for the predetermined utility meter.

30. The apparatus according to claim 7, further comprising an RF module for interrogating a predetermined utility meter by transmitting a signal which includes an identification number for the predetermined utility meter.

31. The apparatus according to claim 2, further comprising an RF module for providing an RF link to an external computer for downloading readings to the external computer.

32. The apparatus according to claim 3, further comprising an RF module for providing an RF link to an external computer for downloading readings to the external computer.

33. The apparatus according to claim 4, further comprising an RF module for providing an RF link to an external computer for downloading readings to the external computer.

34. The apparatus according to claim 5, further comprising an RF module for providing an RF link to an external computer for downloading readings to the external computer.

35. The apparatus according to claim 6, further comprising an RF module for providing an RF link to an external computer for downloading readings to the external computer.

36. The apparatus according to claim 7, further comprising an RF module for providing an RF link to an external computer for downloading readings to the external computer.

37. The apparatus according to claim 8, further comprising an RF module for providing an RF link to an external computer for downloading readings to the external computer.

38. An apparatus for reading a utility meter, comprising:
a RF receiver configured for receiving a data transmission from a utility meter;
an inductive component configured for inductively receiving data from a utility meter;
a processor electrically associated with said RF receiver and said inductive component;
a memory electrically associated with said processor, said memory configured to store reading route data;
a power source electrically associated with at least one of said processor, said RF receiver, said inductive component and said memory; and
wherein said processor is configured to select one of (a) said RF receiver and (b) said inductive component based on said reading route data.

39. An apparatus for reading a utility meter as in claim 38, wherein said reading route data includes expected reading data and wherein said processor is further configured to issue a tamper warning based on a comparison between newly received meter data and said expected reading data.

40. An apparatus for reading a utility meter as in claim 38, further comprising a communication port configured for at least one of (a) downloading data from the apparatus to external digital device, (b) transferring data to said apparatus from a external digital device, (c) reprogramming said apparatus, and (d) upgrading firmware.

41. An apparatus for reading a utility meter as in claim 38, further comprising a visual indicator for indicating the status of a data transfer.

42. An apparatus for reading a utility meter as in claim 41, further comprising a sound generator for indicating the status of a data transfer.

43. An apparatus for reading a utility meter as in claim 38, further comprising a transmitter electrically associated with said processor, said transmitter configured for providing an RF link to an external digital device.

44. An apparatus for reading a utility meter as in claim 43, wherein said processor is further configured to automatically transfer meter data to an external device when the processor determines the amount of free storage capacity for said memory has reached a predefined value.

* * * * *